United States Patent
Cangiano

(10) Patent No.: US 7,316,743 B2
(45) Date of Patent: Jan. 8, 2008

(54) PERFORMANCE CONCRETES THAT DO NOT CONTAIN ADDITIONS WITH LATENT HYDRAULIC ACTIVITY

(75) Inventor: Stefano Cangiano, Torre de Roveri (IT)

(73) Assignee: Italcementi S.p.A. (IT)

( * ) Notice: Subject to any disclaimer, the term of this patent is extended or adjusted under 35 U.S.C. 154(b) by 0 days.

(21) Appl. No.: 10/496,728

(22) PCT Filed: Nov. 22, 2002

(86) PCT No.: PCT/EP02/13167

§ 371 (c)(1),
(2), (4) Date: May 21, 2004

(87) PCT Pub. No.: WO03/043947

PCT Pub. Date: May 30, 2003

(65) Prior Publication Data

US 2004/0244332 A1 Dec. 9, 2004

(30) Foreign Application Priority Data

Nov. 23, 2001 (IT) .......................... MI2001A2480

(51) Int. Cl.
*C04B 7/02* (2006.01)
(52) U.S. Cl. .................. 106/713; 106/737; 106/738
(58) Field of Classification Search ................ 106/644, 106/713, 737, 705, DIG. 1, 738
See application file for complete search history.

(56) References Cited

U.S. PATENT DOCUMENTS

| | | | | |
|---|---|---|---|---|
| 4,933,013 A | * | 6/1990 | Sakai et al. | |
| 6,080,234 A | * | 6/2000 | Clavaud et al. | 106/644 |
| 6,478,867 B1 | * | 11/2002 | Cherezy et al. | 106/644 |
| 6,723,162 B1 | * | 4/2004 | Cheyrezy et al. | 106/644 |
| 6,881,256 B2 | * | 4/2005 | Orange et al. | 106/644 |
| 2004/0247846 A1 | * | 12/2004 | Uzawa et al. | |

FOREIGN PATENT DOCUMENTS

| | | |
|---|---|---|
| DE | 100 28 123 A1 | 8/2001 |
| FR | 919256 | 3/1947 |
| JP | 6199549 | 7/1994 |
| JP | 06199549 | * 7/1994 |
| JP | 11147750 | 6/1999 |
| JP | 11302056 | 11/1999 |
| JP | 2000128616 | 5/2000 |

(Continued)

OTHER PUBLICATIONS

"Application of superfine ore powder in ultrahigh strength pile concrete", Cui et al. Wuhan Gongye Daxue Xuebao (2001), 23(1), 1-5. Abstract only.*

(Continued)

*Primary Examiner*—Paul Marcantoni
(74) *Attorney, Agent, or Firm*—Stetina Brunda Garred & Brucker

(57) ABSTRACT

A solid mixture for the preparation of concretes with a mechanical strength after 28 days that is greater than or equal to 110 MPa comprising cement, calcareous aggregates and admixtures characterised by the fact that any additions with latent hydraulic activity are less than 5% by weight compared to the cement.

23 Claims, 10 Drawing Sheets

FOREIGN PATENT DOCUMENTS

| | | | |
|---|---|---|---|
| JP | 2000211956 | * | 8/2000 |
| JP | 2001181008 | | 7/2001 |
| WO | PCT/FR98/02552 | | 6/1999 |

OTHER PUBLICATIONS

"Modified reactive powder concrete with artificial aggregates" Monosi et al., American Concrete Institute (2000), SP 195 (sixth CANMET/ACI INT'L Conf. on Superplasticizers and oother chemical Admixtures in concrete) p. 447-459. Abstract only.*

"Microstructural study of different types of very high strength concretes", Aiticin et al., Materials Research Society Symposium Proceedings (1987), 85 (Microstruct. Dev Hydration Cem) 261-272. Abstract only.*

Masahiro Ouchi, History of Development and Applications of Self-Compacting Concrete in Japan, International Workshop on Self Compacting Concrete, Aug. 1998, 10 pages.

M. Sari, E. Prat and J.R. Labastire, High Strength Self-Compacting Concrete Original Solutions Associating Organic and Inorganic Admixtures, Cement and Concrete Research, 1999, 6 pages.

S.P. Jiang. J.C. Mutin and A. Nonat, Analysis of the Hydration-Setting Relation: Towards A Comprehensive Approach of the Cement Setting, 1992, vol. IV, 8 pages.

S.P. Jiang, J.C. Mutin and A. Nonat, Effect of Fillers (Fine Particles) on the Kinetics of Cement Hydration, , 1993, 6 pages.

V.S. Ramachandran and Zhang Chun-Mei, Dependence of Fineness of Calcium Carbonate on the Hydration Behaviour of Tricalcium Silicate, Apr. 1986, 22 pages.

S. Sprung and E. Siebel, Assessment of the Suitability of Limestone for Producing Portland Limestone Cement, Jan. 1991, 6 pages.

V Sprung and E. Siebel, Assessment of the Suitability of Limestone for Producing Portland Limestone Cement, Jan. 1991, 11 pages.

S. Rols, M. Mbessa, J Ambroise and J. Pars, Influence of Ultra-Fine Particle Type on Properties of Very-High-Strength Concrete, 15 pages, no date available.

P.K. Mehta, Studies on the Mechanisms by Which Condensed Silica Fume Improves the Properties of Concrete (May 1987), 18 pages.

Huang Cheng-Yi and R.F. Feldman, Hydration Reactions in Portland Cement-Silica Fume Blends, Cement and Concrete Research, 1985, vol. 15, pp. 585-592.

Rachel J. Detwiler and P. Kumar Mehta, Chemical and Physical Effects of Silica Fume on the Mechanical Behavior of Concrete, ACI Materials Journal, Nov./Dec. 1989, 6 pages.

V.M. Malhotra, Advances in Concrete Technology, Canmet, pp. 23-77, no date available.

V. Novokshchenov, Factors Controlling the Compressive Strength of Silica Fume Concrete in the Range 100-150 MPa, Magazine of Concrete Research, Mar. 1992, pp. 53-61.

E. Lang and J. Geiseler, Use of Blastfurnace Slag Cement with High Slag Content for High Performance Concrete, 4th International Symposium on Utilization of High-Strength/High-Performance Concrete, Paris 1996, pp. 213-222.

R.Zeghib and M. Nacer-Bey, Study and Formulation of High Performance Concrete with Various Ultrafine Admixture, Fifth CANMET/ACi International Conference on Superplasticizers and Other Chemical Admixtures in Concrete, Rome, 14 pages, no date available.

P.C. Aitcin, High-Performance Concrete, Modern Concrete Technology 5, 5 pages, no date available.

Vito Alunno Rossetti, Il Calcestruzzo, Materiali e tecnologia, 3 pages, no date available.

ACI International; "High-Performance Concrete and Performance and Quality of Concrete Structures", 2 pages.

European Committee for Standardization; "Fly Ash for Concrete—Part 1: Definition, Specifications and Conformity Criteria"; Feb. 2005; Ref. No. EN 450-1:2005.

* cited by examiner

PERFORMANCE CONCRETES THAT DO NOT CONTAIN ADDITIONS WITH LATENT HYDRAULIC ACTIVITY

FIELD OF INVENTION

The present invention relates to the making of high performance concrete that can be obtained without significant quantities of additional material with latent hydraulic activity, in particular silica fume.

PRIOR ART

Before describing the present invention in detail, it is appropriate to define the meaning of some terms and to refer to the state of the art that can be deduced from technical and patent literature on the subject.

The expression "high performance" currently refers to a relatively wide range of usage properties for cementitious mixtures and in particular the rheological and mechanical performances.

With regards to the rheological performance, a high performance concrete is usually required to be at least thixotropic or, preferably, self-compacting.

With regards to mechanical performance, the expression "high performance" refers to a wide range of mechanical strengths. According to Aitcin (High performance concrete (E& FN SPON—Modern Concrete Technology 5—page 163 Ed. 1998) these types of concrete can be divided into five different categories, each of which is defined by compressive strength values that correspond to those that can be considered to be a technological range in the present state of the art.

TABLE I

Classification of high performance concretes as proposed by Aitcin

| Compressive strength MPa | 50 | 75 | 100 | 125 | 150 |
|---|---|---|---|---|---|
| Category of high performance concrete | I | II | III | IV | V |

Even though there is currently no universally accepted definition of high performance concrete, a study of literature allows us to state that the essential property that qualifies a concrete as being high performance is its mechanical compressive strength that is, however, measured later than or at 28 days, while the other usage properties, which also contribute to classifying concrete at a high performance material, are not considered to be essential as they are additional specific requirements.

Concretes having compressive strength that is higher than 100 MPa are commercially available. Types of concrete with mechanical properties that are much higher than those foreseen by the current design codes are also currently available (e.g. Ductal®—BSI see WO99/28267).

It is well-known that in order to obtain high strength concrete it is necessary to adopt a reduced water/binder ratio (binder here is intended as Portland cement and any other suitable material) and a quantity of binder that is usually higher than the one required for normal level strength concretes (4, 5, 6, 7, 8, 9);

4—Zeghib, R. et al "Study and formulation of high performance concrete with ultrafine admixtures" Fifth ACI/CANMET Conference on superplasticisers and Chemical admixtures in Concrete. Supplementary papers, Rome 1997 pages 286-293;

5—Lang, E et al. "Use of Blast Furnace slag cement with high slag content for high performance concrete"—4$^{th}$ International symposium on Utilisation of high Performance Concrete, Paris 1996, pages 213-222;

6—Novokshchenov, V. "Factors Controlling the compressive strength of silica fume concrete in the range of 100-150 MPa" Magazine of Concrete Research, 1992, N. 158, pages 53-61;

7—Shah, S. P. et al. "High Performance Concrete: Properties and applications" 1994, Mc Graw Hill, Inc, London 403 page;

8—Gjorv, O. E. "High Strength Concrete" In "Advance in Concrete Technology" Ed. CANMET, Edition Malhotra, 1994 pages 19-82;

9—De Larrard "Formulation et proprietes des betons a tres hautes performances. Rapport de recherche Du Laboratoire Central de Ponts et Chaussées, Paris N. 149, 1988, 350 page The current European regulations on concrete (EN 206) permit the addition of ultrafine materials to concrete with the aim of obtaining or improving some properties. The EN 206 regulation considers two types of addition:

Almost inert addition (type I) one of which may be limestone;

Pozzolan type or latent hydraulic activity additions (type II) are fly ash which is compliant with the EN 450 regulation and silica fume compliant with the p.r. EN 13263:1998.

It is known that high performance concretes belonging to categories I and II with a compressive strength up to 100 MPa as set out in the table above can be produced from a large variety of cementitious systems such as:

Pure Portland cement;
Portland cement and Fly ash;
Portland cement and silica fume;
Portland cement, slag and silica fume;

According to Aitcin (1999, pages 190-191), based on data taken from literature, it appears that almost all high performance concretes in category III (from 100 to 125 MPa) contain silica fume, except for very few types of concrete that are produced using Portland cement, whose strength values fall into a area below this category.

Again according to Aitcin (E& FN SPON—Modern Concrete Technology 5—pages 190-191 Ed. 1999) all the high performance concretes that currently belong to categories IV and V, have all been produced using silica fume.

Several studies have looked at the effects of silica fume on the hydration reactions of the cementitious systems. Below there is brief summary of the main results of these studies. It is known that the action of silica fume reveals itself as both a pozzolan addition and as a filler. Silica fume acting as a granular filler between the cement particles can be explained by its extremely reduced dimensions (from 30 to 100 times smaller than that of Portland cement). It has been established that it is possible to replace silica fume with Carbon black and obtain similar strengths (Derweiler and Mehta—1989—"Chemical and Physical effect of silica fume on the mechanical behaviour of concrete" ACI Material Journal Vol. 86 n. 6 pp 609-614). The silica fume particles can also act as nucleation sites and at the same time improve the homogeneity and the fineness of the hydration products (Nehdi, 1995, "The microfiller effect in high performance concrete" Research proposal, department of civil engineering, University of British Columbia.)

According to Cheng Yi and Feldman (1985 Cement and Concrete Research vol. 4 pages 585-592) silica fume speeds up the cement's hydration reaction by encouraging the creation of nucleation sites for Ca(OH)$_2$ crystals even during the initial minutes after the start of the hydration reaction. Metha (1987—Proc. Int. Workshop on condensed silica fume in concrete, Ed. V. M. Malhotra, Montreal.) too maintains that the silica fume particles could act as nucleation sites for the precipitation of Portland cement and that the formation of several small-sized crystals in place of a few large ones could improve the mechanical properties of the cementitious paste.

In contrast to the advantages coming from the use of such an addition material, however, it is necessary to point out that the silica fume addition in some cases seems to cause an increase in shrinkage during the plastic phase and can lead to significant phenomena of micro-flaws/SP 186-39 page 671 (E& FN SPON—Modern Concrete Technology 5—4 page 191 Ed. 1998) e (S. Rols et al. "Influence of Ultra Fine Particle Type on Properties of Very-High strength Concrete ACI SP 186 pages 671-685—Proceedings of Second CANMET/ACI International Conference, RS, Brazil, 1999). It must also be pointed out that the use of silica fume is particularly costly. Again according to Aitcin, this explains why concrete manufacturers tend to avoid using silica fume for the production of high performance concretes that belong to categories I and II. The cost of a type of concrete can almost double when passing from a 90 MPa concrete to a 100 MPa one; concrete with a design strength of 90 MPa can actually easily be produced without silica fume, whereas to currently produce a 100 MPa concrete, about 10% of the mixture must be made up of silica fume. (E& FN SPON—Modern Concrete Technology 5—page 163 Ed. 1998).

While analysing the performances of high performance cementitious materials, it is necessary to highlight the increase in mechanical strength that arises from the presence of steel micro-fibres. It is appropriate to point out that a correct comparison between the performances of cementitious matrixes with different compositions must be made by materials without fibre reinforcement. Finally, the following is deduced from literature:

no cementitious matrix, seasoned in water or in a cloud chamber (20° C., 95% U.R) is capable of achieving such strengths after 28 days that it can be included in category V of table I;

the workability data are not usually included and after examination of literature, however, no published works have been found that refer to concretes (cementitious matrixes) in category IV with self-compacting properties.

No data is available on the development of strength at the first deadlines (24 and 48 hours).

As far as the calcareous filler is concerned, it has long been considered to be inert. Although it cannot be considered as a pozzolanic addition material, many studies have shown that it has a considerable mid and long-term reactivity. S. Sprung, E. Siebel " . . . " Zement Kalk Gibs 1991, N. 1, pages 1-11 put forward the theory that in addition to its main role as a matrix filler, the calcareous filler may also present a certain chemical reactivity towards the aluminate which allows the formation of calcium aluminates to take place. Ramachandran et al. (Ramachandran et al. In "Durability of Buildings Materials", 4 1986) observed that adding CaCO$_3$ to C$_3$S (tricalcium silicate) accelerates hydration. They also discovered that cement hydration is faster due to the calcareous filler. In the cement mixture, CaCO$_3$ would give rise to calcium aluminates that would be incorporated in phases C$_3$S and C$_3$A (tricalcium aluminate) during hydration. S. P. JIANG et al. ("Effect of fillers (Fine particles) on the Kinetics of Cement Hydration 3$^{rd}$ Beijing International Symposium on Cement and Concrete, 1993,3) also showed that the formation of calcium aluminates is advantageous as it would improve strength and accelerate the hydration process. Jiang et al. (S. P. Jiang et al. 9th International Congress of Cem. Chem. New Delhi, 1992) maintained that calcareous filler acts on the kinetics of cement hydration. According to these authors, rather than being attributed to the description above, the acceleration of hydration may instead be attributed to a multiplication of the inter-particle contacts effect and to the nature of these contacts on the calcareous filler surface.

Escadeillas (G. Escadeillas, Les ciments aux fillers calcaires: Contribution a leur optimisation par l'etude des propietés mecaniques et physiques des betons fillerisées, Ph Thesis, Université P Sabatier (1988) 143 p.) observed that in the first few hours of hydration, the heat release from cement containing calcareous filler is greater than that coming from cement without filler and this is even more true the finer the calcareous filler. This is probably due to the acceleration in the hydration of the C$_3$S.

With regards to high performance from a rheological point of view, the importance that self-compacting concrete is gaining is well known.

Self-compacting concrete (SCC) is a special concrete that can run into the formworks just by the effect of its own weight and flow around any obstacles such as reinforcement bars without stopping and without causing any separation phenomena of its elements. Its rheological properties must be preserved until the setting and hardening process begins.

According to the AFGC (Association Française de Genie Civil) self-compacting concretes must meet the following requirements when fresh:

a) The spreading values of the Slump Flows (slump cone) must usually fall within the field 60-75 cm (with no visible segregation at the end of the test, i.e. no lactim aureola along the outer perimeter and no concentration in the centre);

b) The filling ratio of the equipment named L-Box must be greater than 80%;

c) the concrete must not give rise to segregation and must present limited sweating.

At the current state of knowledge, no high performance concretes have been produces without silica fume in category IV or V with self-compacting properties. M. Sari et al. (Cem. Conc. Research n. 29 (1999), for example, obtained a self-compacting high performance concrete with a slump flow of 61.5 cm. The mixtures considered contained 30 kg/m$^3$ of silica fume and presented a 70 MPa strength after 28 days.

From an analysis of the bibliography reviewed, no data or information was found on the possibility of preparing high strength concrete (at least in category III) without silica fume and with the rheological properties that are typical of a self-compacting concrete.

SUMMARY

The Applicant has surprisingly found a solid mixture for the preparation of concretes with a mechanical strength after 28 days that is greater than or equal to 110 MPa comprising cement, such as cement that is compliant to the European regulation 197-1, calcareous aggregates and admixtures characterised by the fact that any additions with latent hydraulic activity are less than 5% by weight compared to the cement.

The variance between the curves of the prior art and the curves of the invention can clearly be seen.

Figure 2:
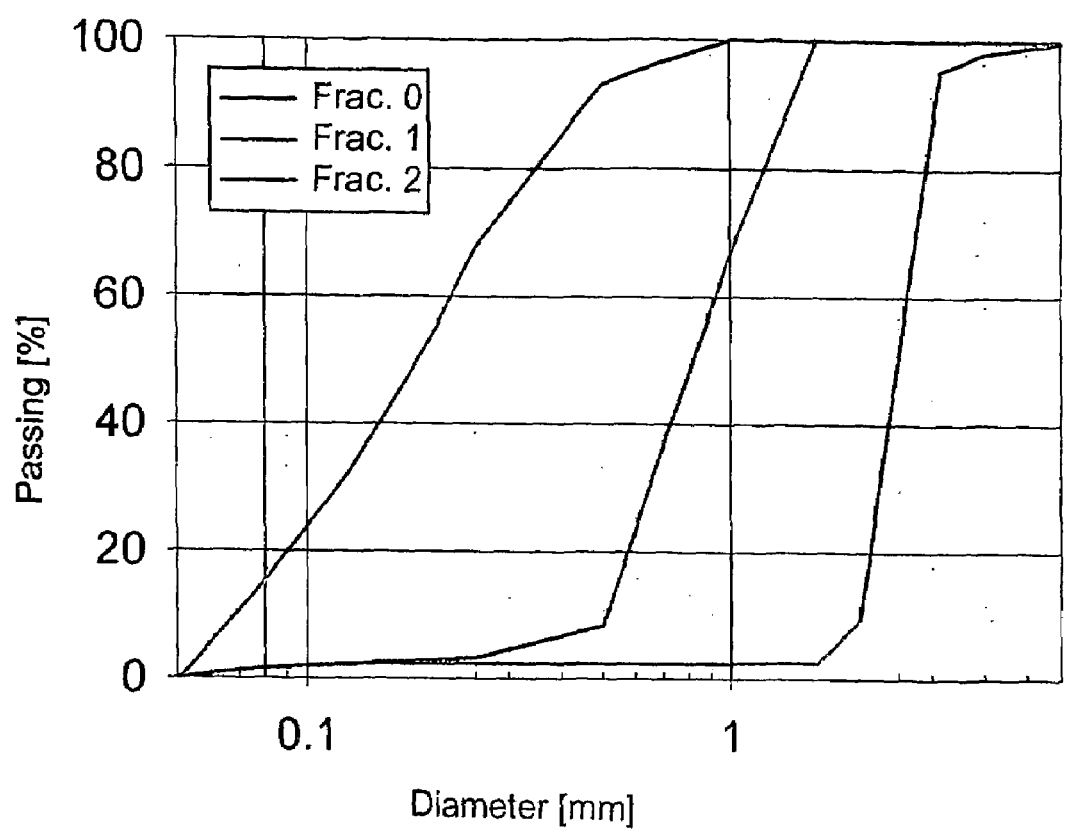

FIG. 2 shows the experimental curves of the particle-size distribution of the three fractions of calcareous aggregate a1 (fraction 0, fraction 1 and fraction 2).

Figure 3:
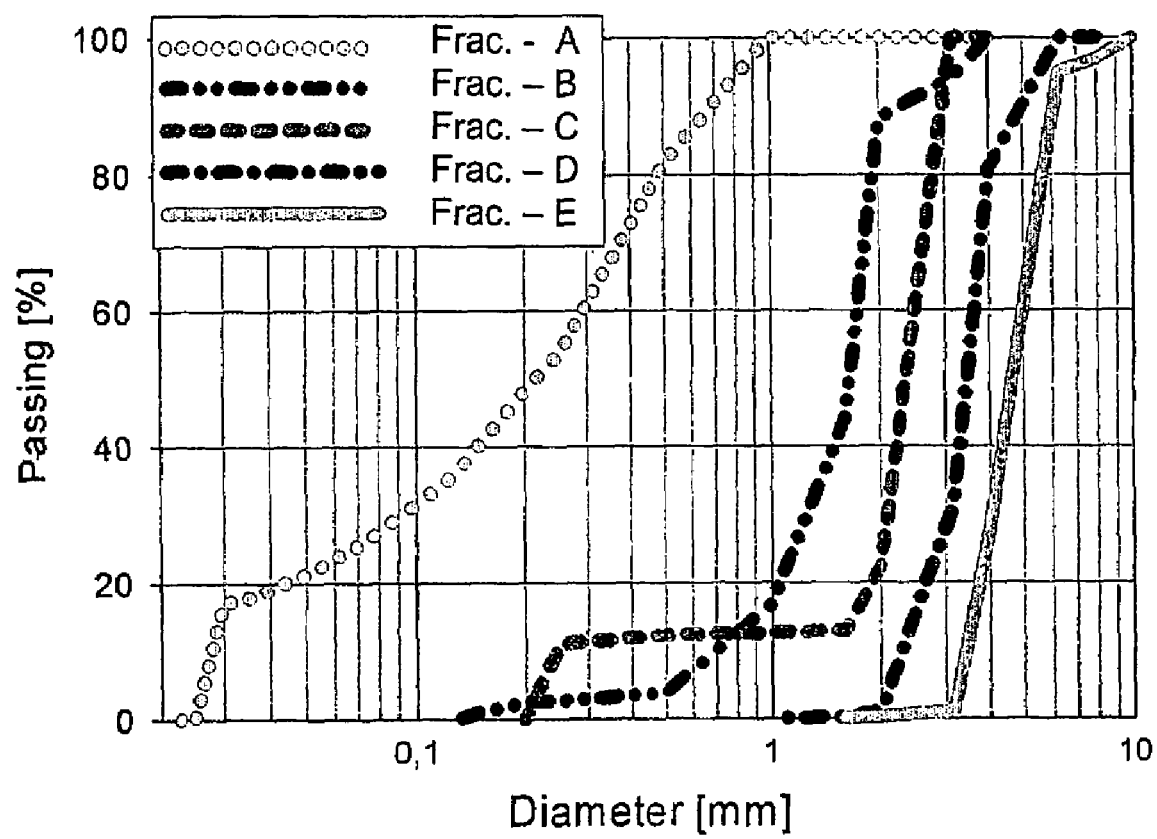

FIG. 3 shows the experimental curves of the particle-size distribution of the five fractions of calcareous aggregate a1 (fraction A, fraction B, fraction C, fraction D and fraction E).

Figure 4:
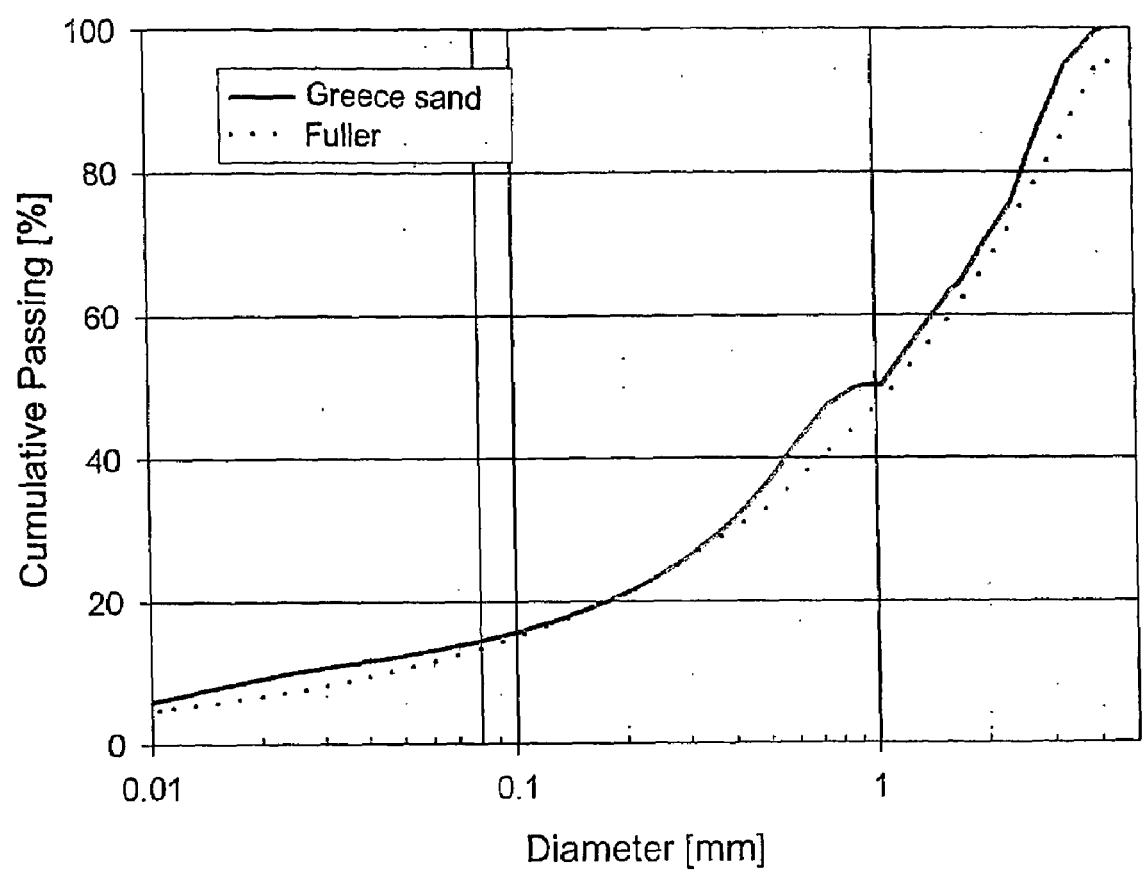

FIG. 4 shows the experimental curves of the particle-size distribution of the sole fraction of comparative calcareous aggregate a2. As can be seen, the curve is near to the Fuller curve.

Figure 5:
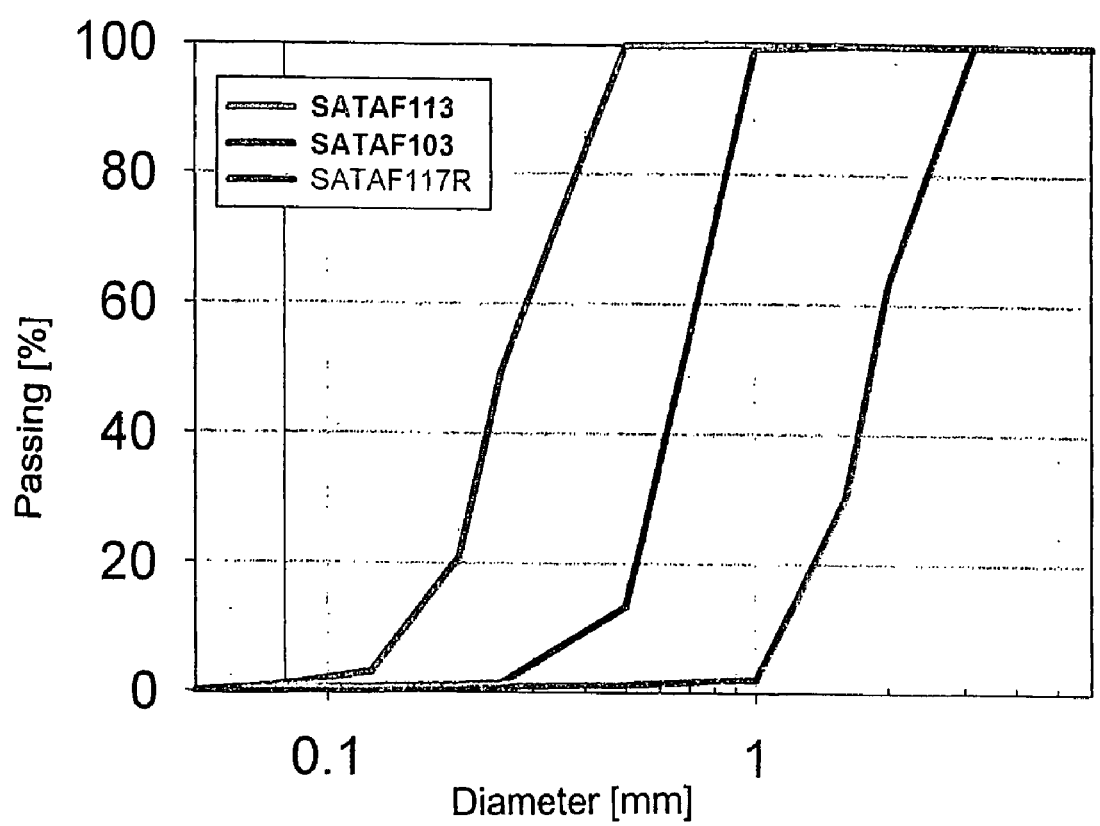

FIG. 5 shows the experimental curves of the particle-size distribution of the three commercial silica-calcareous aggregate fractions b (Sataf 113, Sataf 103, Sataf 117 R respectively).

Figure 6:
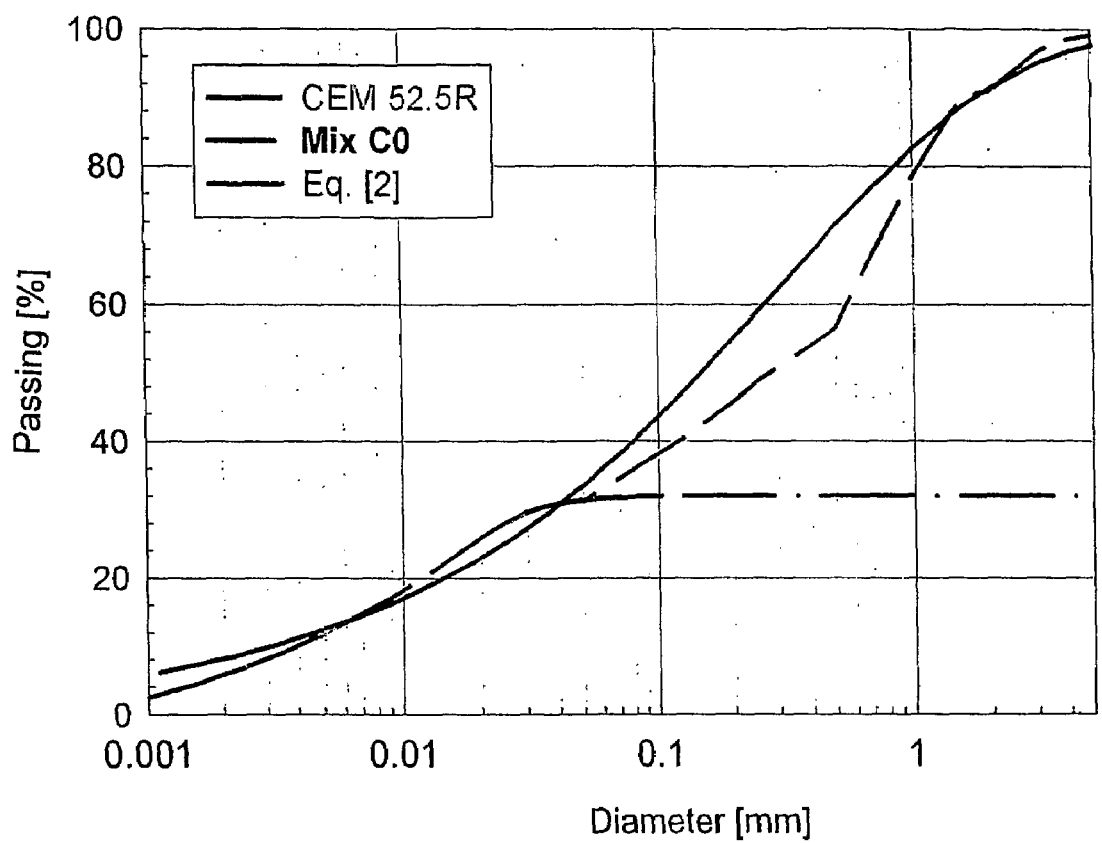

FIG. 6 shows the cumulative distribution curve of the cement in relation to its maximum content in the solid mixture (21%); the reference (according to equation [2]) and actual particle-size distribution curves of the solid mixture of the invention CO are also shown. It can be seen that the distribution curve joins with the cement curve without causing particularities, it also has a flex point of x=0.315 mm.

Figure 7:
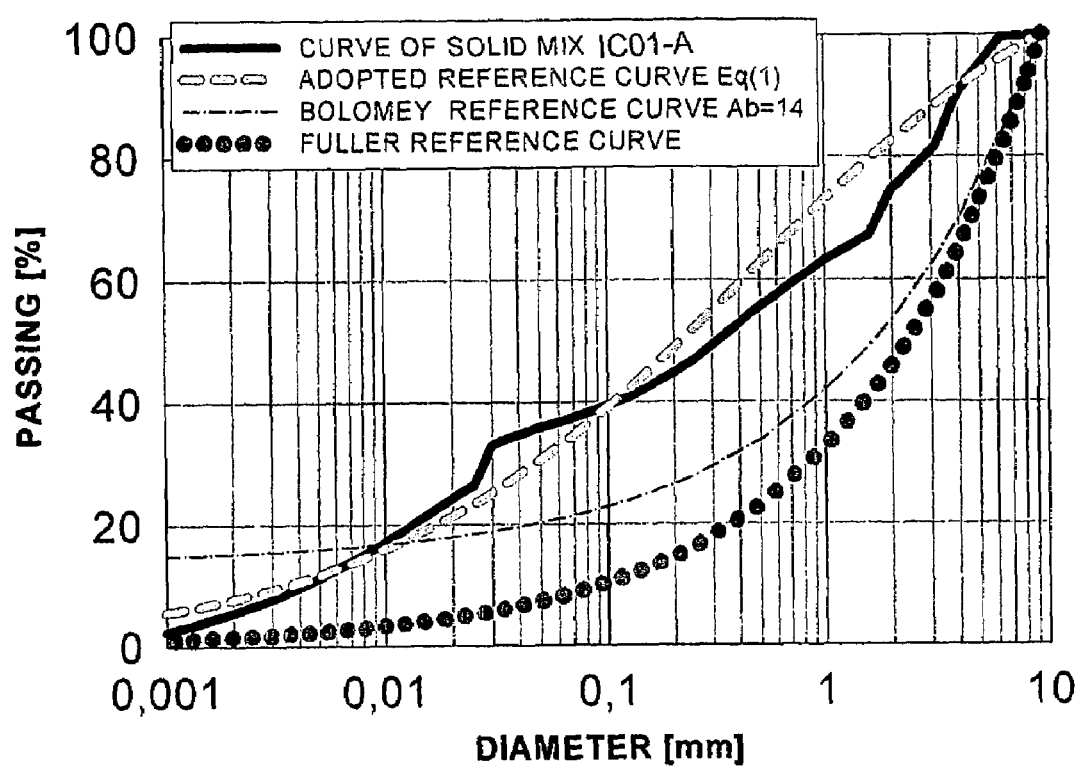

FIG. 7 shows the particle-size distribution of the above-mentioned solid CO1 mixture, the particle-size distribution curve according to equation [1] wherein A=0.822 compared with the other curves normally used as reference curves for the system: aggregate+cement, i.e. more specifically the well-known Fuller and Bolomey curves are shown. With regards to the Bolomey curve, parameter $A_B$ takes on the limit value 14, has been considered.

Figure 8:
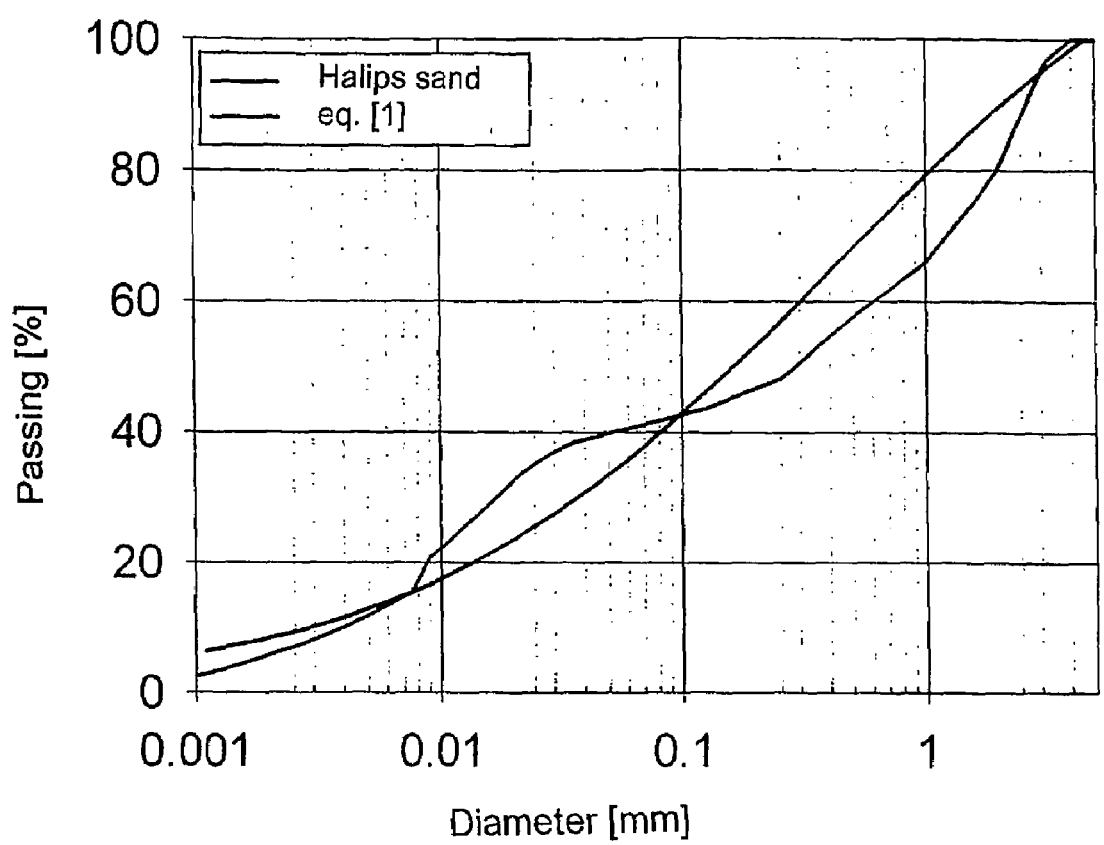

FIG. 8 describes the particle-size distribution curve of the solid mixture C1 compared to the reference curve corresponding to the equation [1] wherein A=0.75.

If one looks at FIG. 8, the considerable variance from the reference curve Eq.[1] wherein A=0.75, in the upper region of the typical particle-size field of CEM 52.5R, can clearly be seen.

Figure 9:
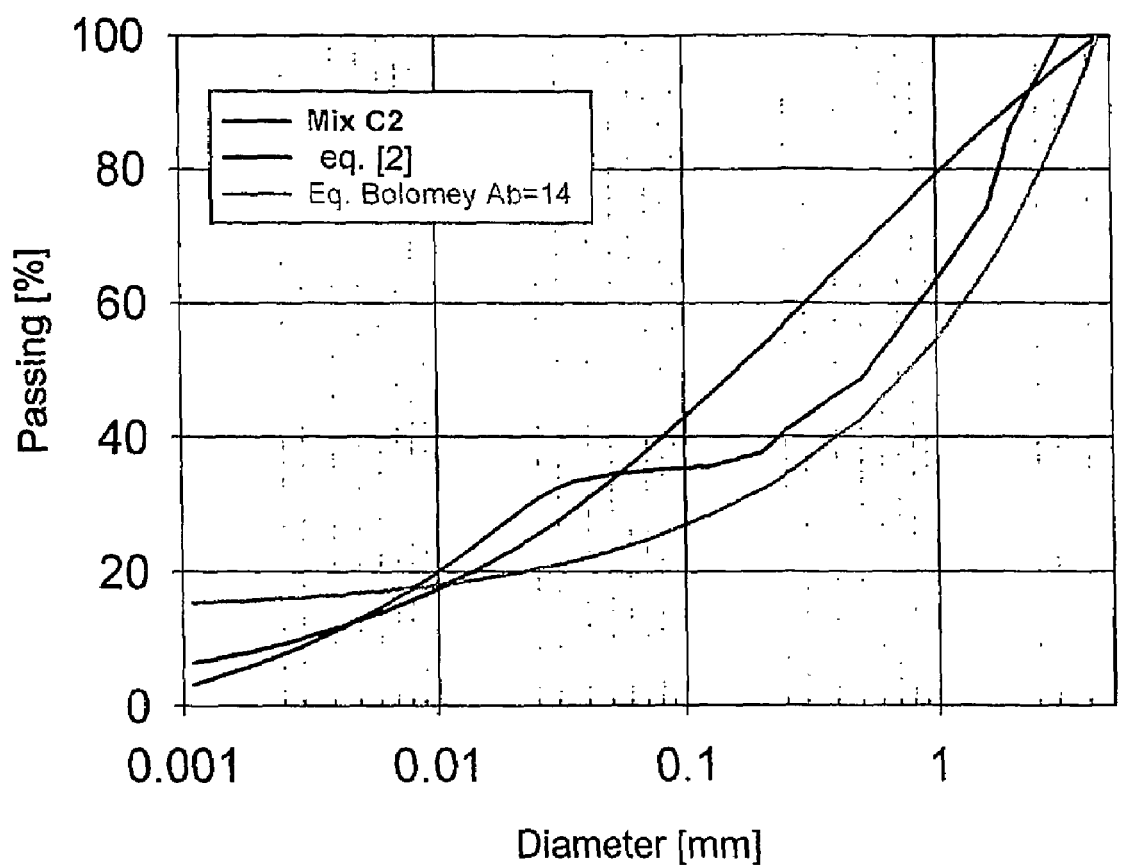

FIG. 9 shows the particle-size distribution curve of the solid mixture C2 for comparison. FIG. 9 shows that the mixture made from CEM 52.5R and calcareous aggregate has a considerable variance from the reference curve Eq.[2], and tends to resemble the Bolomey curve by $A_B$=14.

Figure 10:
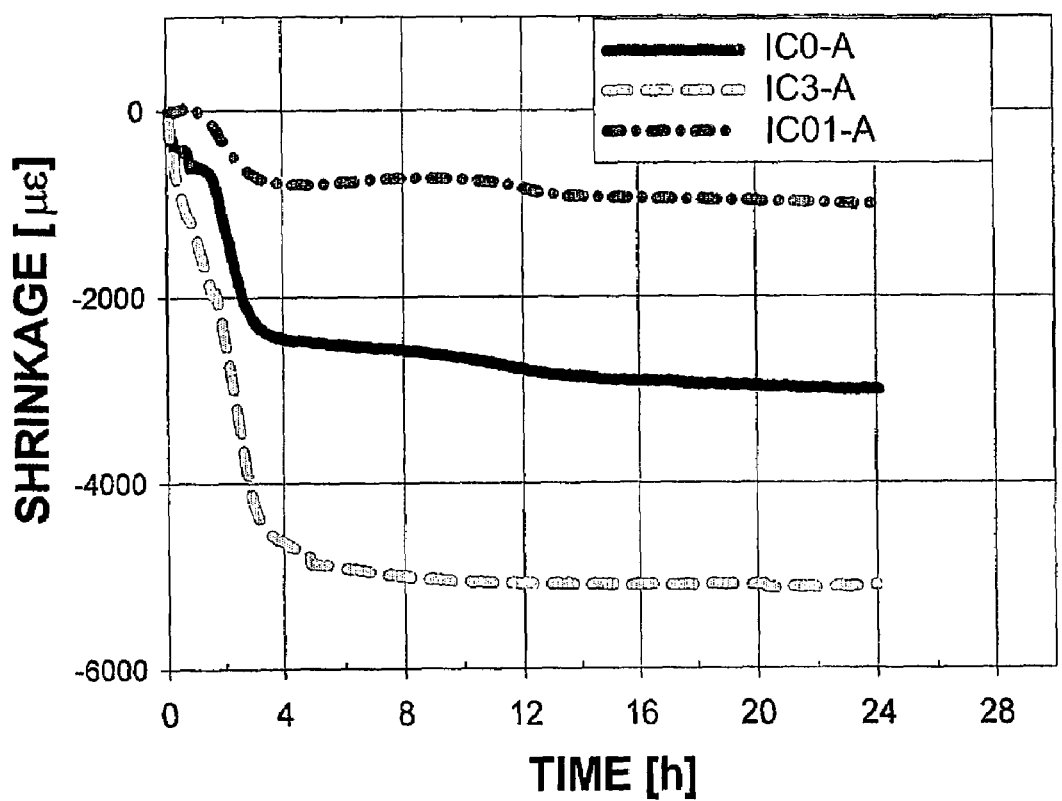

FIG. 10 shows the behaviour of the ICO-A mix and ICO1-A mix characterised by a much more limited shrinkage during the plastic phase than that found in the quartz aggregate and vitreous silica based mix IC3-A.

DETAILED DESCRIPTION OF THE INVENTION

Object of the Present Invention

The object of the present invention is to perfect a concrete formula with the following characteristics:

1) absence of significant quantities of type II additions (for example silica fume)
2) a mechanical strength after 28 days that is greater than 110 MPa and/or a development of compressive strength to the extent that it ensures the values contained in table II below.

TABLE II

Performance requirements required for the development of mechanical strength.

| Deadline [days] | 1 | 2 | 28 |
|---|---|---|---|
| Rc [MPa] | ≥50 | ≥80 | ≥110 |

The expression: "without significant quantities of additions with a latent hydraulic activity" is intended to mean that these additions must be less than 5% by weight compared to the cement, and preferably less than 2%.

A further object of the present invention is to perfect a formula of a self-compacting concrete satisfying the characteristics as set out in points a), b) and c) described above.

Another object of the invention is to obtain fibre-reinforced concretes with rapid hardening, without significant quantities of type II additions, for example silica fume.

It has been surprisingly found out that it is possible to achieve the aims described above, to the contrary of the bias expressed by the prior art, by using an optimal particle-size composition of the solid cement mixture and calcareous aggregate. In particular, it was found that if such a particle-size composition is used that the passing percentage composition according to the diameter of the particles follows that of the curve constructed according to table III below, it is possible to obtain a high performance concrete with development of mechanical strength in time as indicated in Table II, without significant quantities of pozzolanic type additions.

TABLE III

| Diameter (mm) | Passing % |
|---|---|
| 0.002 | 5-12 |
| 0.005 | 10-13 |
| 0.01 | 15-20 |
| 0.1 | 30-40 |
| 0.2 | 40-60 |
| 0.4 | 50-75 |
| 0.7 | 60-85 |
| 1 | 70-90 |
| 2 | 85-95 |

The particle-size composition of the solid mixture can be more appropriately described by curve that is represented by the equation:

$$P\% = \frac{1}{A + \frac{(1-A)}{\sqrt{\frac{x}{D_{max}}}}} \cdot 100 \quad (\text{for } 0 < x \leq D_{max}) \quad [1]$$

Where:
P %=cumulative passing;
x=diameter of the solid particles in mm;
A=experimental parameter which has the following values: 0.75 or 0.822;
$D_{max}$=maximum diameter of aggregate in mm;
Another possible curve is as follows:

$$P\% = 1 - e\left(\frac{-x}{C}\right)^D \cdot 100 \qquad [2]$$

Figure 1:
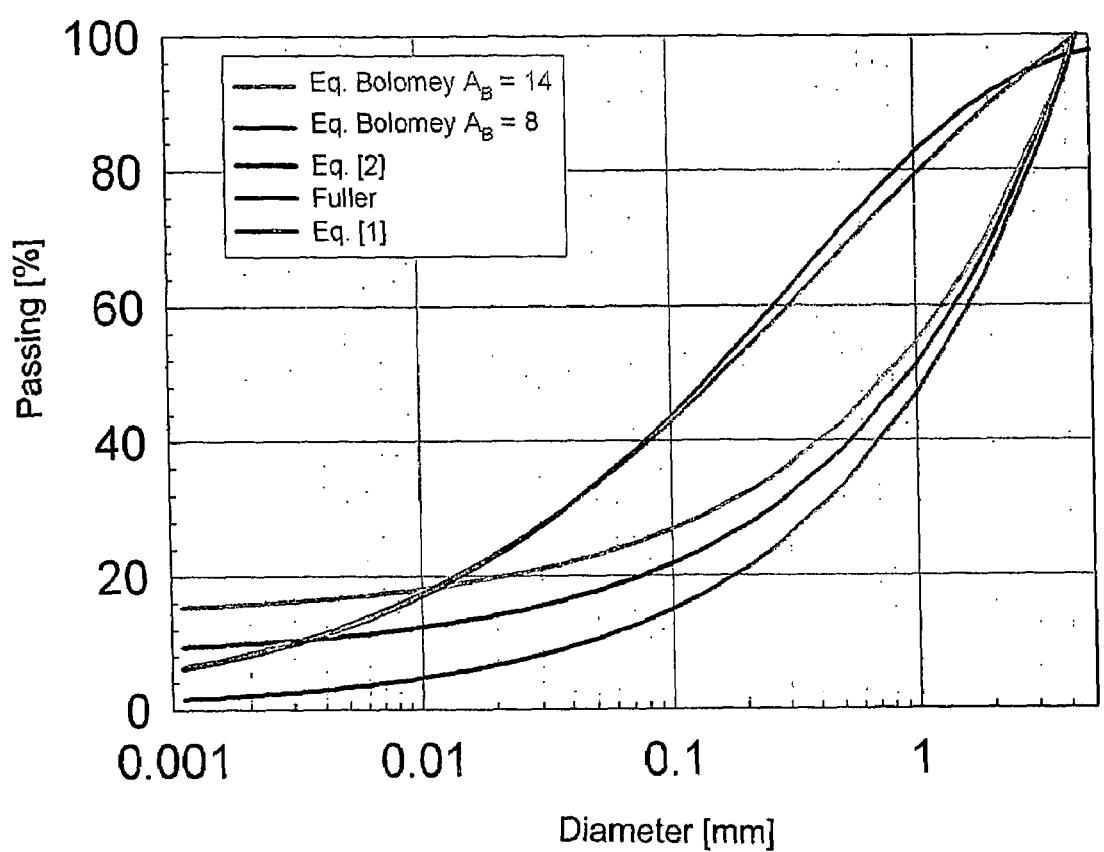
FIG. 1 shows the reference curves corresponding to the equations [1] wherein A=0.75 and [2]; they are compared with the other curves normally used as reference curves for the system: aggregate+cement, i.e. more specifically the well-known Fuller and Bolomey curves are shown. With regards to the Bolomey curve, the two curves whose parameter $A_B$ depending on the aggregate form, takes on the two limit values of 8 and 14 have been considered.

Where:
P %=cumulative passing;
x=diameter of the solid particles in mm;
C, D=experimental parameters (C=0.315 [mm], D=0.486);
The value C=0.315 mm indicates the diameter below which 63.2% of the solid mixture passes.
FIG. 1 contains the reference curves that correspond to the equations [1] and [2]; they are compared with the other curves normally used as reference curves for the system: aggregate+cement; more specifically, the well-known Fuller and Bolomey curves have been included, which respectively have the equation:

$$P\% = 100\sqrt{x/D_{MAX}} \qquad [3]$$

Where:
P %=cumulative passing;
x=diameter in mm;
$D_{max}$=maximum dimension of aggregate;

$$P\% = [A_B + (100 - A_B)\sqrt{x/D_{MAX}}] \qquad [4]$$

Where:
P %=cumulative passing;
x=diameter in mm;
$D_{max}$=maximum dimension of aggregate;
$A_B$=Bolomey parameter (typically takes on the two limit values of 8 and 14 depending on the aggregate shape)
Some of the preferred embodiments according to the present invention are as follows:
A solid mixture for the preparation of concrete with a mechanical strength after 28 days that is greater than or equal to 110 MPa, comprising cement, such as cement that is compliant with the European regulation 197-1, calcareous aggregates and admixtures, characterised by the fact that the possible latent hydraulic activity additions are less than 5% in weight compared to the cement;
A solid mixture for the preparation of concrete with a mechanical strength after 28 days that is greater than or equal to 110 MPa, comprising cement, calcareous aggregates and admixtures, characterised by the fact that the possible latent hydraulic activity additions are less than 2% in weight compared to the cement.
A solid mixture for the preparation of concrete that over time has the following development of mechanical strength: after one day: ≧50 MPa; after 2 days: ≧80 MPa; after 28 days: ≧110 MPa; and comprising cement, such as cement that is compliant with the European regulations 197-1, calcareous aggregates and admixtures, characterised by the fact that any latent hydraulic activity additions are less than 5% in weight compared to the cement.
A solid mixture for the preparation of concrete that over time has the following development of strengths: After one day: ≧50 MPa; after 2 days: ≧80 MPa; after 28 days: ≧110 MPa; and comprising cement, such as cement that is compliant with the European regulations 197-1, calcareous aggregates and admixtures, characterised by the fact that any latent hydraulic activity additions are less than 2% in weight compared to the cement.

According to the present invention cement and hydraulic binder are synonyms. As cements to prepare the solid mixture according to the present invention, all cements or hydraulic binder in general, and more specifically those according to the EN 197-1 regulation, can be used.

More over according to the present invention as a further preferred embodiment the cement in the solid mixture is CEM I 52.5 R or CEM III A 52.5 R, with a slag content of 40% by weight compared to the clinker. In general the cement is present from 25% to 50% by weight, preferably from 30% to 35% by weight compared to the total solid mixture. Furthermore in a preferred embodiment of the present invention the calcareous aggregates are crushed calcareous aggregates with a $CaCO_3$ content that is greater than or equal to 95% by weight compared to the total weight of the aggregate.

The solid mixture according to the present invention has the calcareous aggregates with a $D_{Max}$ (maximum Diameter) from 2 mm to 12 mm, preferably from 4 to 8 mm or from 8 to 12 mm, most preferably of 9.5 mm.

As a further preferred embodiment the admixtures in the solid mixture are either acrylic or naphthalenesulfonate admixtures, in particular the acrylic admixtures are present from 0.4% to 1.2% by weight, preferably from 0.5% to 0.8% by weight, compared to the weight of the cement; the naphthalenesulfonate admixtures are present from 1.9% to 2.5% by weight compared to the weight of the cement. As a further preferred embodiments the solid mixture, according to the present invention, it further comprises metal fibres.

Further preferred embodiments according to the solid mixture which is the common inventive concept of the present invention are as follows:
A cementitious mix for the preparation of concrete with a mechanical strength after 28 days that is greater than or equal to 110 MPa comprising a solid mixture according to the present invention, characterised by the fact that any additions with latent hydraulic activity are less than 5% by weight compared to the cement and that have a water/cement ratio from 0.2 to 0.3, preferably from 0.24 to 0.26.
A concrete with a mechanical strength after 28 days that is greater than or equal to 110 MPa comprising a solid mixture according to the present invention, characterised by the fact that any additions with latent hydraulic activity are less than 5% by weight, preferably less than 2% by weight, compared to the cement.
The concrete according to claim 22 with a mechanical strength after 28 days that is greater than or equal to 110 MPa comprising a solid mixture according to claim 1, characterised by the fact that any additions with latent hydraulic activity are compared to the cement.
A solid mixture based on cement and aggregate mainly of calcareous type, containing an addition with latent hydraulic activity in quantities less than 5% by weight, characterised by the fact that the particle-size distribution of the mixture is shown on the graph of the cumulative percentage of passing material according to the size of the particles in mm, from a curve that substantially corresponds to the curve defined by the equation:

$$P\% = \frac{1}{A + \frac{(1-A)}{\sqrt{\frac{x}{D_{max}}}}} \cdot 100 \quad (\text{for } 0 < x \leq D_{max}) \quad [1]$$

Where:
P %=cumulative passing;
x=diameter of the solid particles (mm);
A=experimental parameter (=0.75);
$D_{max}$=maximum diameter of aggregate (mm);
or the above said solid mixture based on cement and aggregate of mainly calcareous type, wherein in the equation [1] the experimental parameter A is 0.822.

A solid mixture based on cement and aggregate of mainly calcareous type, containing an addition with latent hydraulic activity in quantities less than 5% by weight, characterised by the fact that the particle-size distribution of the mixture is shown on the graph of the cumulative percentage of passing material according to the size of the particles in mm, from a curve that substantially corresponds to the values shown in table III.

Preferably, the aggregate of mainly calcareous type is limestone.

The following examples are conveyed by way of indication, not of limitation, of the present invention.

EXAMPLES

Experimental Part

The materials used for the experiment were:

Cement

A CEM cement type I category 52.5R and a CEM cement type III, 52.5R were used, both compliant with the regulation EN 197-1 and with a Blaine fineness of 4900 cm²/g.

Admixtures

Commercial acrylic admixtures (Superflux® AC 2003) and naphthalenesulfonate admixtures (Superflux NF®), were used.

Mixing Water

A type of mixing water was that is compliant with pr EN 1008:1997.

Aggregates

The following aggregates were used:
a) type a1 and a2 crushed limestone;
b) Tondo di fiume of a silica-calcareous nature;
c) Pure crushed quartzite;

a1—Crushed Limestone Aggregate

The limestone used was characterised by a compact crystalline structure, coming from the Rezzato (BS) quarry, and with a chemical composition as indicated in table IV, and the same table shows the average value of water absorption. The cumulative particle-size distribution, i.e. the particle-size distributions of the three fractions (fraction 0, fraction1 and fraction 3) or the particle-size distributions of the five fractions (fraction A, fraction B, fraction C, fraction D, fraction E) are shown in FIG. 2 and FIG. 3 respectively.

TABLE IV

Chemical composition and average value of water absorption of the a1 type limestone aggregate

| | |
|---|---|
| $CaCO_3$ | 98.61% |
| $Mg\, CO_3$ | 0.87% |
| $SiO_2$ | 0.13% |
| $Al_2O_3$ | 0.01% |
| $Fe_2O_3$ | 0.03% |
| $Na_2O$ | 0.12% |
| $K_2O$ | 0.07% |
| T.O.C.[1] | 0.02% |
| Absorption $H_2O$ | 0.28% |

[1]T.O.C. stands for: Total Organic Carbon a2—Crushed Limestone Aggregate

For comparison purposes an a2 crushed limestone aggregate from the Halips quarry (Greece) was used, that is characterised by the fact that is was supplied in a single size with a maximum diameter of 4.5 mm (substantially the same as that of the fraction 2 of the a1 limestone aggregate). The cumulative particle-size distribution is shown in FIG. 4.

If we examine the afore-mentioned figure, it is possible to observe that this distribution is close to that of the well-known particle-size curve Fuller (II calcestruzzo—Materiali e tecnologia di Vito Alunno Rossetti—Mc Graw-Hill 1995 pp 103-104).

Table V contains the chemical composition and the average value of water absorption for the aggregate a2.

TABLE V

Chemical composition and average value of water absorption of the limestone aggregate "Halips"

| | |
|---|---|
| $CaCO_3$ | 97.5% |
| $Mg\, CO_3$ | 0.87% |
| $SiO_2$ | 0.30% |
| $Al_2O_3$ | 0.14% |
| $Fe_2O_3$ | 0.12% |
| $Na_2O$ | <0.08% |
| $K_2O$ | <0.04% |
| T.O.C.[1] | 0.025% |
| Absorption $H_2O$ | 0.18% |

[1]T.O.C. stands for: Total Organic Carbon

On comparing the data contained in table IV and the data contained in table V, it can reasonably be stated that the two calcareous aggregates a1 and a2 have the same chemical composition and water absorption characteristics.

b—Silica-Calcareous tondo di fiume

For comparison reasons, an aggregate of river origin b was used with the composition shown in table VI, while the cumulative particle-size distribution of the three commercial particle-size fractions (Sataf 113, Sataf 103, and Sataf 117R respectively) is shown in FIG. 5.

TABLE VI

Chemical composition and water absorption of the silica-calcareous aggregate

| | |
|---|---|
| $CaCO_3$ | 9.20% |
| $Mg\, CO_3$ | 15.86% |
| $SiO_2$ | 71.08% |
| $Al_2O_3$ | 6.46% |
| $Fe_2O_3$ | 3.12% |
| $Na_2O$ | 1.05% |

TABLE VI-continued

Chemical composition and water absorption of the silica-calcareous aggregate

| | |
|---|---|
| $K_2O$ | 1.23% |
| T.O.C.[1] | — |
| Absorption. $H_2O$ | 0.33% |

[1]T.O.C. stands for: Total Organic Carbon c—Pure Crushed Quartzite

For comparison purposes pure crushed quartzite was used as an aggregate, according to the patent WO 99/28267.

Fibres

Berkert ON 13 straight steel fibres were used

Mix Composition

The concrete mix composition according to the invention comprises:

from 25% to 50% by weight and preferably 30÷33% of type 1 CEM 52.5R cement;

silica fume less than 5% by weight and preferably less than 2%, compared to the cement weight, crushed limestone aggregate with $D_{max}$ (maximum diameter) from 2 mm to 12 mm, preferably with $D_{max}$ (maximum diameter) from 4 mm to 8 mm, also preferably with $D_{max}$ (maximum diameter) from 8 mm to 12 mm, most preferably with a $D_{max}$ (maximum diameter) of 9.5 mm in quantities as a complement to 100 compared to the cement.

acrylic-based super fluidifying agent from 0.4% to 1.2% by weight (preferably 0.5-0.8%) or naphthalene-sulfonate-based from 1.9 to 2.5% by weight expressed as a dry substance on the cement water/cement ratio: 0.2-0.3 (preferably 0.24-0.26).

The above-stated percentages of cement and aggregate refer to the total mixture of solids.

The limestone aggregate preferably has a $CaCO_3$ content that is greater than or at least equal to 95% by weight compared to the aggregate mass.

Typical Mixture According to the Invention

As the typical mixture cement plus calcareous aggregate according to the invention, the one in which the calcareous aggregate is type a1 is considered herein.

The CO mixture: cement plus calcareous aggregate that is best adapts to the optimal curve, following the equation [1] wherein A=0.75 is the one below, indicated as "CO mixture", and which has the composition shown in table VII.

TABLE VII

Composition of the CO mixture

| | |
|---|---|
| Aggregate fraction 0 | 22.8% |
| Aggregate fraction 1 | 35.2% |
| Aggregate fraction 2 | 10% |
| CEM I 52.5R | 32% |

FIG. 6 shows the particle-size distribution of the above-mentioned solid CO mixture and the particle-size distribution curve according to equation [2] for reference.

The CO1 mixture: cement plus calcareous aggregate that is best adapts to the optimal curve, following the equation [1] wherein A=0.822 is the one below, indicated as "CO1 mixture", and which has the composition shown in table VIII.

TABLE VIII

Composition of the CO1 mixture

| | |
|---|---|
| Aggregate fraction A | 30.0% |
| Aggregate fraction B | 15.4% |
| Aggregate fraction C | 4.68% |
| Aggregate fraction D | 10.25% |
| Aggregate fraction E | 10.67% |
| CEM I 52.5R | 29.0% |

FIG. 7 shows the particle-size distribution of the above-mentioned solid CO1 mixture, the particle-size distribution curve according to equation [1] wherein A=0.822 and the Fuller and Bolomey curves for reference.

In particular, $D_{max}$ for the aggregate fractions is 9.5 mm.

Preparation of Mixtures According to the Prior Art for Comparison with the Mixtures According to the Present Invention Comparison Mixture with CEM I 52.5R and Limestone in a Single Size (Aggregate a2) C1 Mixture For comparison purposes with the optimised mixture, a mixture was produced that was made up of CEM I 52.5R and limestone in a single size which had a particle-size distribution as shown in FIG. 8 for the solid C1 mixture, by comparison with the reference curve following the Eq. [1] wherein A=0.75.

The composition of the mixture was as follows:

TABLE IX

Composition of the solid C1 mixture

| | |
|---|---|
| Cement 52.5 R type I | 32% |
| Calcareous aggregate (limestone) in a single size | 68% |

If one examines FIG. 8, the considerable variance from the reference curve can be seen in the upper region of the typical particle-size curve of the CEM 52.5R, whose cumulative curve is shown, in relation to its content in the mixture.

Mixture for Comparison with CEM 52.5R and Silica-Calcareous tondo di fiume (Aggregate b) C2 Mixture.

A mixture of silica-calcareous aggregate and CEM I 52.5 R cement was prepared with the composition shown in table X:

TABLE X

Composition of the C2 mixture (CEM 52.5R and silica-calcareous aggregate).

| | |
|---|---|
| Sataf 113 aggregate | 10.86% |
| Sataf 103 aggregate | 16.85% |
| Sataf 117R aggregate | 37.29% |
| CEM I 52.5R | 33% |

FIG. 9 demonstrates that the mixture made up of CEM I 52.5R and silica calcareous aggregate has a significant variance from the reference curve, following the equation [1] wherein A=0.75, and tends to resemble the Bolomey by $A_B=14$.

Comparison Mixture with Quartz Aggregate (C) (Ductal®) C3 Mixture

In order to compare the performances of the calcareous cementitious mixture and a quartz-based cementitious mixture, the basic mixture (without any fibre reinforcement)

known commercially as DUCTAL®, whose solid materials composition is shown in table XI, was examined.

TABLE XI

Composition of the Ductal solid mixture
(*) Cement with a high content of silica ($C_3S > 75\%$)

| | |
|---|---|
| Cement 52.5R HTS (*) | 32.74% |
| Vitreous Silica SEPR (Silica Fume) | 10.66% |
| Quartz flour | 9.81% |
| Quartz sand (D max = 0.5 mm) | 46.79% |

Typical Mixture of the Invention with Cement CEM Type III/A, 52.2 R: C4 Mixture.

A solid mixture was prepared for a fibre-reinforced concrete mix.

TABLE XII

Composition of the solid C4 mixture

| | |
|---|---|
| Cement 52.5 R type III/A* | 45% |
| Aggregate fraction 0 | 18% |
| Aggregate fraction 1 | 28% |
| Aggregate fraction 2 | 9% |

*the cement used in this solid mixture contains anhydrite, as an activator, as an amount of 3% by weight on the cement.

Preparation of the Mixes for the Comparison Tests.

Various mixes were prepared with the solid mixtures described in the previous paragraphs.

TABLE XIII

Composition of the mixes

| Mix | Solid Mixture | Water/binder ratio | Hyper-fluidifying admixture |
|---|---|---|---|
| ICO-A | CO | 0.26 | Acrylic-based admixture 0.6%** |
| ICO1-A | CO1 | 0.276 | Acrylic-based admixture 0.65%** |
| ICO-N | CO | 0.30 | Naphthalenesulphonate-based admixture 2.5%** |
| IC1-A | C1 | 0.26 | Acrylic-based admixture 0.6%** |
| IC1-N | C1 | 0.30 | Naphthalenesulphonate-based admixture 1.9%** |
| IC2-A | C2 | 0.26 | Acrylic-based admixture 0.6%** |
| IC2-N | C2 | 0.30 | Naphthalenesulphonate-based admixture 2.5%** |
| IC3-A | C3 | 0.21 | Acrylic-based admixture 1.8%** |
| IC4-A | C4 | 0.22 | Acrylic-based admixture 0.6% |

**admixture as a dry substance in % on the binder
A = acrylic-based admixture (Superflux 2003)
N = naphthalenesulfonate-based admixture (Superflux NF)

Packing Procedure for the Mixes.

The mixes were prepared used a highly effective "HOBART" mixer. During the first mixing stage, the anchor was turned at the minimum number of rotations 140±5 rpm for 60 seconds, slowly adding water and the admixture; the mixing was continued until a pasty consistency (≅3') was obtained. After this stage, the mixing was faster (285±10 rpm) for another 30". The mixture was then rested for 90" and then the mixture was mixed again at a higher speed for 120". Metal filters were added for the mix with the solid C4 mixture, after the first mixing cycle.

Characterisation of the Product According to the Invention, Compared with Products According to the Prior Art.

Rheological Performance

The following table XIV contains the flow % values [Uni 7044] found on the mixes indicated in table XIII.

TABLE XIV

Rheological properties of the examined mixes.

| Identification no. | Flow % | Notes |
|---|---|---|
| ICO-A | 170 | Self-compacting |
| ICO-N | 182 | Self-compacting |
| IC1-A | 130 | Thixotropic |
| IC1-N | 190 | Self-compacting |
| IC2-A | 130 | Thixotropic |
| IC2-N | >200 | Self-compacting |
| IC3-A | >200 | Thixotropic |
| IC4 A | >200 | Self-compacting |

A = acrylic-based admixture
N = naphthalenesulfonate-based admixture
ICO = invention For the mixes ICO-A and ICO1-A, also believed to be the most promising with regards to the development of mechanical strength, rheological characterisation were extended to the purpose of checking the requisites of self-compacting concrete. The results obtained can be seen in table XV and table XVI respectively.

TABLE XV

Rheological characterisation of the mix ICO-A

| Test | Result | Notes |
|---|---|---|
| Slump-flow | 760 mm | Positive result |
| L-box | Complete filling (100%) | Positive result |
| U-box | At the end of the test, the difference in level between the two chambers was zero | Positive result |
| Funnel | ≅30" | Accentuated cohesion/viscosity properties |

TABLE XVI

Rheological characterisation of the mix ICO1-A

| TEST | TEST RESULT | Reference values (UNI Draft) |
|---|---|---|
| FLOW | $T_{500} = 12"$ | ≤12" |
| | $D_{max} = 750$ mm | >600 mm |
| L-box | $h_2/h_1 = 1$ | $h_2/h_1 > 0.80$ |
| U-box | $\Delta h = 0$ mm | $\Delta h \leq 30$ mm |
| Flow time | 20" | 4-12" |

As there are no Italian or European regulations, the tests shown above were carried out according to the descriptions given in "M. Ouchi, History of Development and Applications of SCC in Japan—Proceedings of the first international workshop on self-compacting concrete—University of Technology, Kochi, Japan, 1998.

Seasoning of the Test Pieces.

All the test pieces, packed in metal moulds 40×40×160 mm in size, were dislodged from the moulds 24 hours after casting and were placed for seasoning in water at 20±2° C. until the pre-set deadline. It proved necessary to extend the keeping of the test pieces in the mould for 48 hours instead of 24 hours solely for the test pieces identified as IC3 (Ductal®) as that they did not show clear signs of hardening (the deadline of 48 hours is the one indicated in the already quoted patent WO 99/28267.

Shrinkage During the Plastic Phase

Shrinkage tests during the plastic phase were carried out on some of the mixes indicated in table XIII (ICO-A, ICO1-A and IC3-A).

The behaviour of the ICO-A mix, and more over for the ICO1-A mix, were highlighted, characterised by a much more limited shrinkage during the plastic phase than that found in the quartz aggregate and vitreous silica based mix IC3-A (see FIG. 10).

Strength Performances

TABLE XVII

Compressive strength values [MPa] found according to EN. 196.1 for the mixes prepared with an acrylic admixture

| Mix | 24 hours | 2 days | 7 days | 28 days |
| --- | --- | --- | --- | --- |
| ICO-A | 79.45 | 99.18 | 122.4 | 138.37 |
| IC1-A | 49.7 | 61.92 | 76.71 | 83.17 |
| IC2-A | 51.7 | 84.76 | 98.7 | 108.0 |
| IC3-A | 91.5 | 98.4 | 125 | 136.3 |

Note.
The deadline dates of the mix IC3-A should actually be moved by two days (e.g. the 1 day value was actually taken 1 day after removal from the mould and therefore 3 days after mixing)

On examining the data contained in tables XIV and XVII the following conclusions can be made:
1) When using the acrylic admixture, with an equal water/cement ratio, only the ICO-A mix allows self-compacting concretes to be obtained.
2) The development of mechanical strength over time for the concrete from the ICO-A mix of the invention is certainly better than that of the comparison mixes IC1-A, IC2-A and IC3-A. Note in particular the marked differences in mechanical strength for the mixes made from the dry matrixes C0 and C1 for which the chemical compositions and the shape or morphology of the aggregates are the same.
3) It is possible to obtain concrete, without a pozzolanic addition, that has a mechanical strength close to 140 MPa after 28 days.

TABLE XVIII

Compressive strength values [MPa] found according to EN 196.1 for the mixes prepared with a naphthalenesulfonate admixture

| Mix | 24 hours | 2 days | 7 days | 28 days |
| --- | --- | --- | --- | --- |
| ICO-N | 54.6 | 80.71 | 98.06 | 112.92 |
| IC1-N | 44.66 | 60.7 | 76.36 | 88.74 |
| IC2-N | 32.4 | 72.52 | 89.52 | 101.84 |

On examining the data contained in table XVI, the following conclusions can be made:
1) The development of mechanical strength over time for the concrete from the ICO-N mix of the invention is certainly better than that of the comparison mixes IC1-N and IC2-N. Note in particular the marked differences in mechanical strength for the mixes made from the dry matrixes C0 and C1 for which the chemical compositions and the shape or morphology of the aggregates are the same.

2) It is possible to obtain a concrete, without a pozzolanic addition, that has a mechanical strength exceeding 100 MPa after 28 days.

It is a known fact that the reinforcement action carried out by a steel fibres system on a cementitious matrix depends, in equal conditions, on the bonding between the fibres and the matrix itself.

The adhesion of the fibres to the cementitious matrix is usually entrusted to the mechanical anchoring that, as is known, depends on the length (or more precisely on the length/diameter ration) of the fibres and their shape. For this reason, the steel fibres usually have a suitable shape (hook, wavy, tapered at the ends etc) to ensure adequate mechanical bonding. The use of shaped fibres, or fibres with high aspect ratios can however lead to a higher penalisation of the rheological performance of the mixes.

For this reason in the specific case, non-shaped fibres were preferred, which were 16 mm long and with a diameter of 0.13 mm, so as not to compromise the rheological performance of the mixture.

TABLE XIX

Compressive strength values in MPa found according to EN 196.1 for the mix IC4-A containing fibres.

| Mix | 24 hours | 2 days | 7 days | 28 days |
| --- | --- | --- | --- | --- |
| IC4 A (fibres present as 1% in volume) | 99.1 | 102.6 | 141.3 | 152.0 |

TABLE XX

Flexural strength values in MPa found according to the EN 196.1 for the mix IC4-A containing fibres.

| Mix | 24 hours | 2 days | 7 days | 28 days |
| --- | --- | --- | --- | --- |
| IC4-A (fibres present as 1% in volume) | 15.7 | 20.0 | 23.7 | 27.4 |

As can be seen, the addition of steel fibres determines a substantial increase in mechanical strength, as the mechanical strength values are already near to 100 MPa 24 hours after the mix is made up.

TABLE XXI

Mechanical strength values in MPa found according to the corresponding EN directive, for the mix ICO1-A.

| TIME [d] | Compressive strength [MPa] | Flexural Strength [MPa] | Modulus of Elasticity* (dynamic) [MPa] |
| --- | --- | --- | --- |
| 1 | 85 | 10.8 | 43 491 |
| 2 | 92 | 15.2 | 44 900 |
| 7 | 103 | 18.9 | 46 000 |
| 28 | 118.5 | 20.6 | 48 100 |

*Modulus of Elasticity according to UNI 9771.

The invention claimed is:
1. A solid mixture for the preparation of concrete with a compression strength after 28 days that is greater than or equal to 110 MPa, comprising cement, calcareous aggregates and acrylic or naphthalenesulphonate admixture, and pozzolan additions in amount from 0% to 5% by weight of cement, wherein the particle-size distribution of the mixture is shown on the graph of the cumulative percentage of passing material according to the size of the particles in mm, from a curve that substantially corresponds to the values shown in the following table:

| Diameter (mm) | Undersize % |
| --- | --- |
| 0.002 | 5-12 |
| 0.005 | 10-13 |
| 0.01 | 15-20 |
| 0.1 | 30-40 |
| 0.2 | 40-60 |
| 0.4 | 50-75 |
| 0.7 | 60-85 |
| 1 | 70-90 |
| 2 | 85-95. |

2. The solid mixture according to claim 1 wherein the cement is a cement that is compliant with the European regulation 197-1.

3. The solid mixture according to claim 1 for the preparation of concrete with a compression strength after 28 days that is greater than or equal to 110 MPa, characterised by the fact that the pozzolan additions are from 0% to 2% by weight of cement.

4. The solid mixture according to claim 1 for the preparation of concrete that over time has the following development of compression strength:
after one day: $\geq 50$ MPa; after 2 days: $\geq 80$ MPa; after 28 days: $\geq 110$ MPa.

5. The solid mixture according to claim 3 for the preparation of concrete that over time has the following development of compression strengths:
after one day: $\geq 50$ MPa; after 2 days: $\geq 80$ MPa; after 28 days: $\geq 110$ MPa.

6. The solid mixture according to the claim 1 wherein the cement is CEM I 52.5 R.

7. The solid mixture according to claim 1 wherein the cement is CEM III A 52.5 R, with a slag content of 40% by weight of clinker.

8. The solid mixture according to claim 1 wherein the cement is present from 25% to 50% by weight of the total solid mixture.

9. The solid mixture according to the claim 8 wherein the cement is present from 30% to 35% by weight of the total solid mixture.

10. The solid mixture according to claim 1 wherein the calcareous aggregates are crushed calcareous aggregates with a $CaCO_3$ content that is greater than or equal to 95% by weight of the total weight of the aggregate.

11. The solid mixture according to claim 1 wherein the calcareous aggregates have a $D_{Max}$ or maximum diameter from 2 mm to 12 mm.

12. The solid mixture according to claim 11 wherein the calcareous aggregates have a $D_{Max}$ or maximum diameter from 4 to 8 mm.

13. The solid mixture according to claim 11 wherein the calcareous aggregates have a $D_{Max}$ or maximum diameter from 8 to 12 mm.

14. The solid mixture according to claim 11 wherein the calcareous aggregates have a $D_{Max}$ or maximum diameter of 9.5 mm.

15. The solid mixture according to claim 1 wherein the acrylic admixtures are present from 0.4% to 1.2% by weight of the cement.

16. The solid mixture according to claim 15 wherein the acrylic admixtures are present from 0.5% to 0.8% by weight of the cement.

17. The solid mixture according to claim 1 wherein the naphthalenesulfonate admixtures are present from 1.9% to 2.5% by weight of the cement.

18. A cementitious mix for the preparation of concrete with a compression strength after 28 days that is greater than or equal to 110 MPa comprising a solid mixture according to claim 1 characterised by the fact that any pozzolan additions are from 0% to 5% by weight compared to of cement and that have a water/cement ratio from 0.2 to 0.3.

19. The cementitious mix according to claim 18 characterised by the fact that the water/cement ratio is from 0.24 to 0.26.

20. A concrete with a compression strength after 28 days that is greater than or equal to 110 MPa comprising a solid mixture according to claim 1, characterised by the fact that any pozzolan additions are from 0% to 5% by weight of cement.

21. The concrete according to claim 20 with a compression strength after 28 days that is greater than or equal to 110 MPa comprising a solid mixture according to claim 1, characterised by the fact that any pozzolan additions are less than 2% by weight of cement.

22. A solid mixture for the preparation of concrete with a compression strength at 28 days that is $\geq 110$ MPa, based on cement and aggregate being mainly calcareous and without a pozzolan addition, characterised by the fact that the particle-size distribution of the mixture is shown on the graph of the cumulative percentage of passing material according to the size of the particles in mm, from a curve that substantially corresponds to the values shown in the following table:

| Diameter (mm) | Undersize % |
| --- | --- |
| 0.002 | 5-12 |
| 0.005 | 10-13 |
| 0.01 | 15-20 |
| 0.1 | 30-40 |
| 0.2 | 40-60 |
| 0.4 | 50-75 |
| 0.7 | 60-85 |
| 1 | 70-90 |
| 2 | 85-95. |

23. The solid mixture based on cement and aggregate being mainly calcareous according to claim 22 wherein the aggregate is limestone.

* * * * *